United States Patent [19]

James

[11] 4,355,982
[45] Oct. 26, 1982

[54] HANG GLIDER FLIGHT SIMULATOR

[75] Inventor: Christopher James, Sydney, Australia

[73] Assignee: Arthur Sydney Herbert, Plimmerton, New Zealand

[21] Appl. No.: 210,025

[22] Filed: Nov. 24, 1980

[51] Int. Cl.³ .............................................. G09B 9/02
[52] U.S. Cl. ...................................... 434/30; 244/16
[58] Field of Search ................... 434/30, 34, 38, 44, 434/55; 244/16; 272/1 C, 16, 17, 18, 24, 31 A, 31 B

[56] References Cited

U.S. PATENT DOCUMENTS

| | | | |
|---|---|---|---|
| 1,342,871 | 6/1920 | Ruggles | 434/55 |
| 1,865,828 | 7/1932 | Buckley | 434/55 |
| 2,396,660 | 3/1946 | Kanter | 434/55 |
| 3,101,645 | 8/1963 | Hemstreet | 434/44 |
| 3,476,385 | 11/1969 | Foy | 272/24 |
| 3,995,799 | 12/1976 | Bartolini | 244/16 |

*Primary Examiner*—William H. Grieb
*Attorney, Agent, or Firm*—Holman & Stern

[57] ABSTRACT

A hang glider flight simulator wherein a pilot is is suspended from a harness. A control apparatus for maneuvering the suspended pilot simulates movements occurring during hang gliding. A visual display is positioned to be viewed by the pilot. The maneuvering apparatus is synchronized with the visual display so that the simulated movements correspond to images being displayed. The simulator allows persons learning to fly hang gliders to do so without the risk involved in actual flight.

14 Claims, 11 Drawing Figures

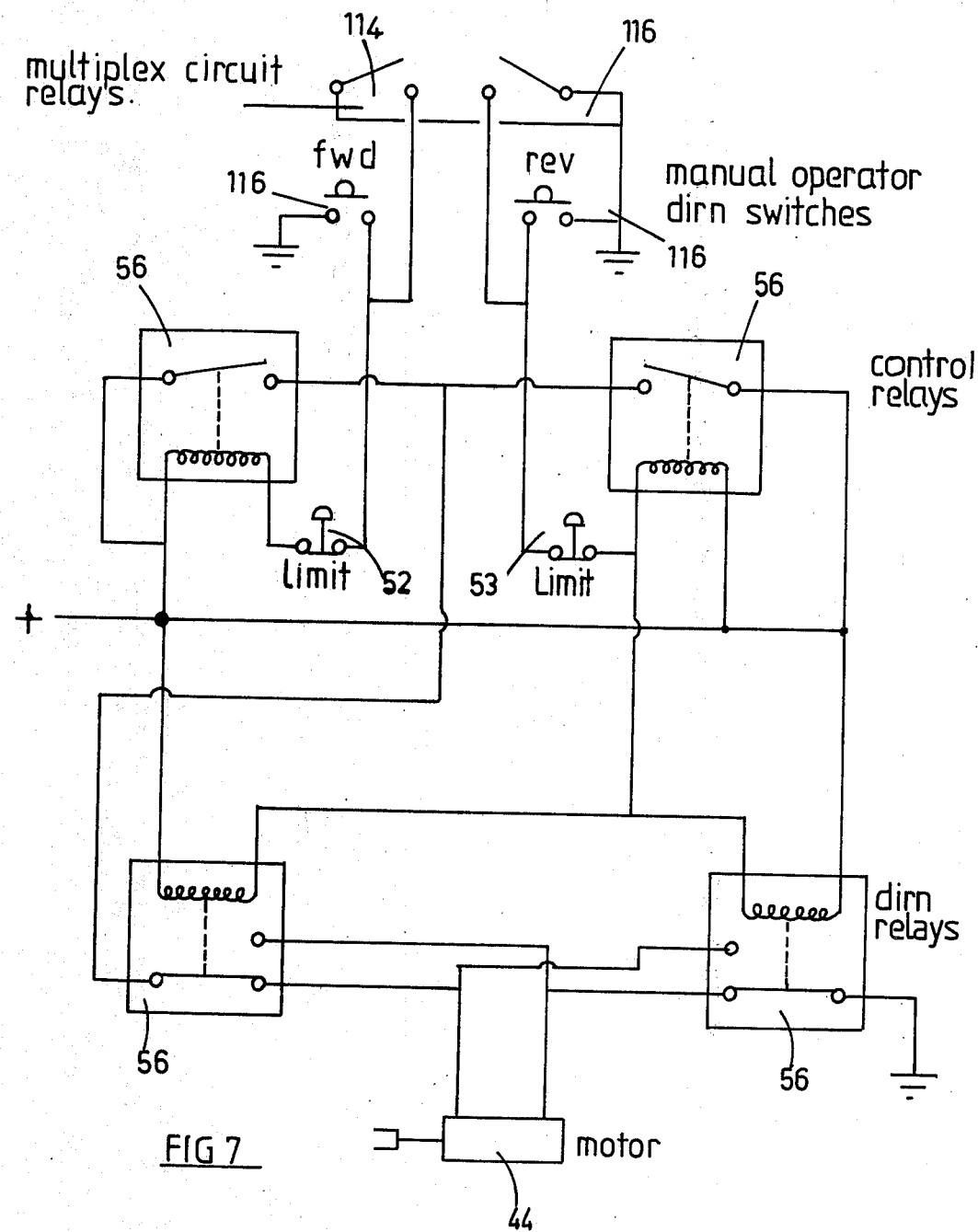

HANG GLIDER FLIGHT SIMULATOR

BACKGROUND OF THE INVENTION

1. Field of Invention

This invention relates to a hang glider flight simulator.

2. Discussion of Prior Art

Hang gliding has come into vogue in recent years following the development of the Rogallo wing as a spin off from the U.S. space program. Although experienced pilots can control hang gliders under most conditions in relative safety there are many dangers to the inexperienced. To my knowledge the only way to date to learn how to fly a hang glider is to either be towed behind some form of towing vehicle either on land or in water or else to leap off the edge of a cliff or steep hill. The dangers of such a procedure are obvious. I am not aware of any previous attempts to construct a hang glider flight simulator.

Air craft simulators are known. However, the control mechanisms involved in the control of aircraft are far more sophisticated and expensive than those needed for controlling a hang glider. Aircraft flight simulators involve different principles from those involved in flying a hang glider and are consequently not relevant to the development of a hang glider flight simulator such as the present one.

It is an object of this invention to provide a hang glider simulator so as to avoid risk to training pilots or at least to provide the public with a useful choice.

SUMMARY OF INVENTION

Accordingly the invention may be said broadly to consist in a hang glider flight simulator comprising a pilot suspending means, a control means, means from which said pilot suspending means and control means are suspended, means associated with said means from which said pilot suspending means and control means are suspended for maneuvering said pilot suspending means and said control means to simulate movements occuring during hang gliding, visual display means positioned to be viewed by a pilot in said pilot suspending means, and, means for synchronising said means for maneuvering with said visual display means so that in use movements simulated by said means for maneuvering correspond to images displayed by said visual display means.

BRIEF DESCRIPTION OF THE DRAWINGS

In the accompanying drawings:

FIGS. 5a and 5b are detailed top plan views of pully mechanisms illustrated in FIG. 5, FIG. 7 is a schematic diagram of the wiring of a circuit controlling a maneuvering motor.

DETAILED DESCRIPTION

Figure 1:
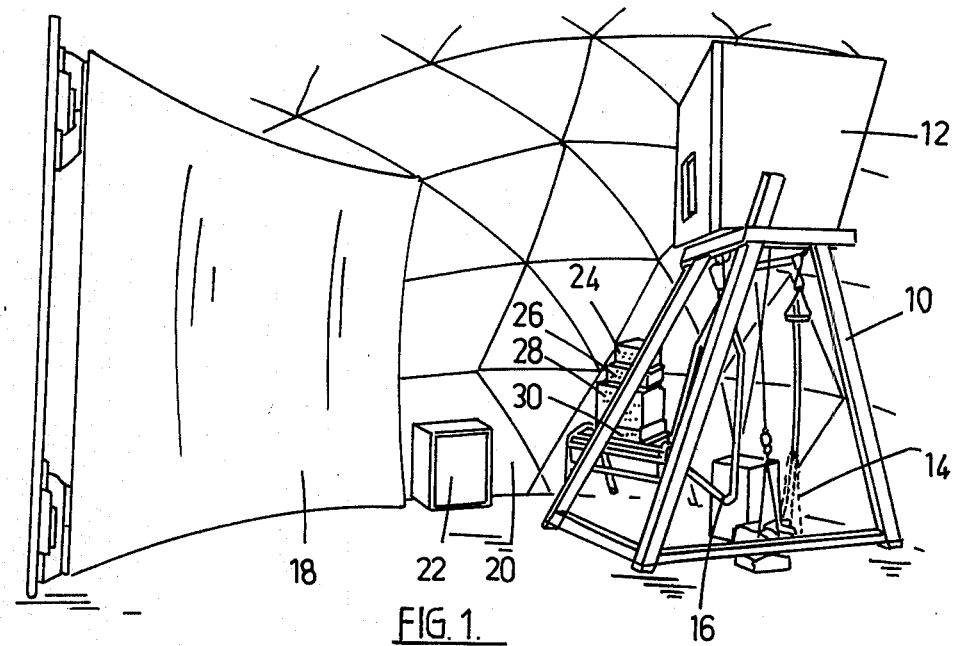
FIG. 1 is a perspective view of the components of a preferred embodiment of the apparatus according to the invention.

The flight simulator comprises a substantially pyramidal frame 10 on which is mounted a projection box 12. From immediately below box 12 there is suspended a pilot's harness 14 and an A frame control bar 16. Aligned with the opening of the projection box 12 is a parabolic screen 18. The entire apparatus is preferably housed in a light-tight enclosure. In a preferred embodiment such an enclosure is a geodesic dome 20 constructed of lightweight aluminum panels.

A pair of speakers, one of which is illustrated as speaker 22, provide an audio accompaniment to the film to be projected on screen 18.

The electronics for synchronizing the pilot's suspending harness 14 and control bar 16 with the film to be projected consist of a decoder 24, a signal synchronizer 26, a tape deck 28 and an amplifier 30.

Positioned on the floor immediately below projecter enclosure 12 is the A frame maneuvering means illustrated in FIG. 2. A substantially square hole 31 is provided through the floor of the projection box 12. The A frame head 32 is suspended from a gimbal 29. Gimbal 29 consists of an outer ring 23 and an inner ring 25. The former is mounted with a pair of brackets 21 on a suitable surface or frame within projection box 12. Head 32 is retained within ring 25 by grub screws or the like. Head 32 is maneuvered by stainless steel wires 33, 33', 33", and 33'" which are substantially orthoganol to one another. The front of the apparatus facing parabolic screen 18 is indicated by arrow A in FIG. 2.

Cables 33 continue from head 32 over a pulley 34 on a swivel base to a two way tension spring 62 joined to a pivotal gear driven quadrant 38. In the opposite direction a two way tension spring 61 is attached to wire 33' which proceeds around pulley 36 on a swivel mount to the other side of quadrant 38. Analogously cable 33' proceeds downwardly from head 32 around pulley 37 to two way tensioning spring 60 on one side of second quadrant 40. Similarly, wire 33'" extends over pulley 35 to the other free corner of quadrant 40. The geared arcuate edge of quadrant 38 is aligned with gear box 42 which is driven by a 12 volt DC reverse polarity motor 44. An identical motor 48 drives gear box 46 to pivot quadrant 40. The straight orthogonal edges of quadrant 38 are each aligned to contact travel limiting switches 50 and 51 and the similar edges of quadrant 40 are aligned to contact limiting switches 52 and 53.

The operation of motor 44 is controlled by circuit relays 54 and those of motor 48 are controlled by circuit relays 56. Connectors 58 lead to a source of 12 volt DC power such as an automotive storage battery.

Figure 3:
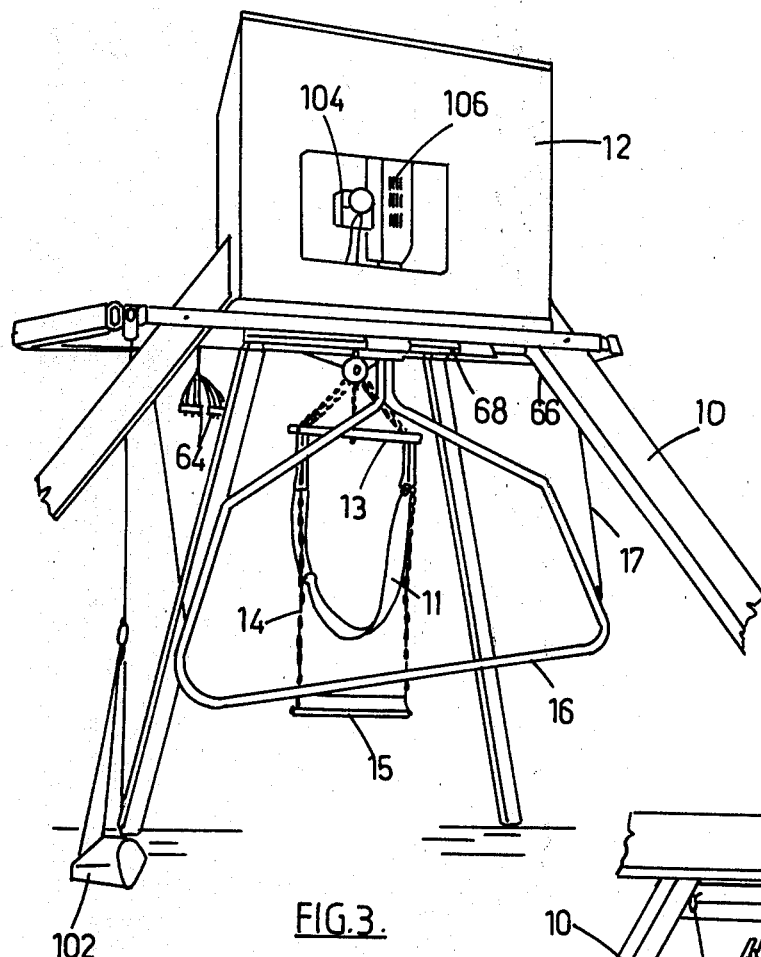
FIG. 3 is a front perspective view of a main portion of the apparatus showing a trapeze-type pilot harness and/or seat.

In FIG. 3 there is illustrated a trapeze type harness 14 having a seat 15 and a spreader bar 13 together with a safety strap 11. To one side of A bar 16 there is provided a stabilising wire 17 which passes around a pulley 66 mounted on frame 10 through a hook or eye 68 and joins another mirror image static stabilising wire. Manual operating control box 64 with four switches is also illustrated in FIG. 3. A 16 mm projector 104 having a wide angle lens is employed in a preferred embodiment. It is coupled with a continuous loop attachment for the film. Preferably a Fumeo S.p.A. model 9510 continuous loop attachment is provided.

Figure 4A:
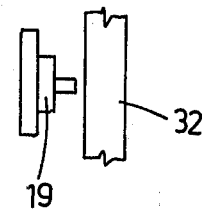
FIG. 4A is a fragmentary detailed view showing the stall warning activating switch.
Figure 4B:
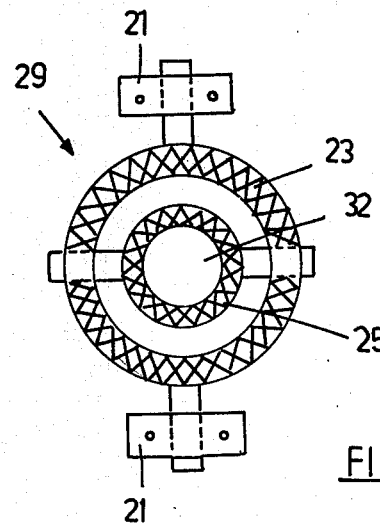
FIG. 4B is a fragmentary detailed view showing the gimbal from which the A frame control bar is suspended.
Figure 4:
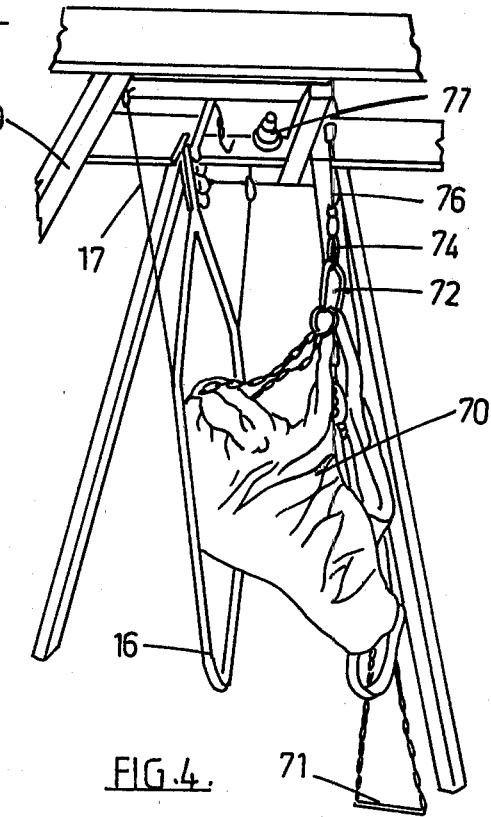
FIG. 4 is a side view of a portion of the apparatus showing a prone harness and control bar.

In FIG. 4 there is illustrated a prone type of harness 70 together with stirrup 71. The harness is mounted from a ring 72 in a hook 74 from cable 76.

A stall warning horn 77 is illustrated. In FIG. 4A there is illustrated the bar 32 at the top of A frame 16 which activates switch 19 which in turn activates stall warning horn 77 when control bar 16 is pushed too far forward.

Figure 5:
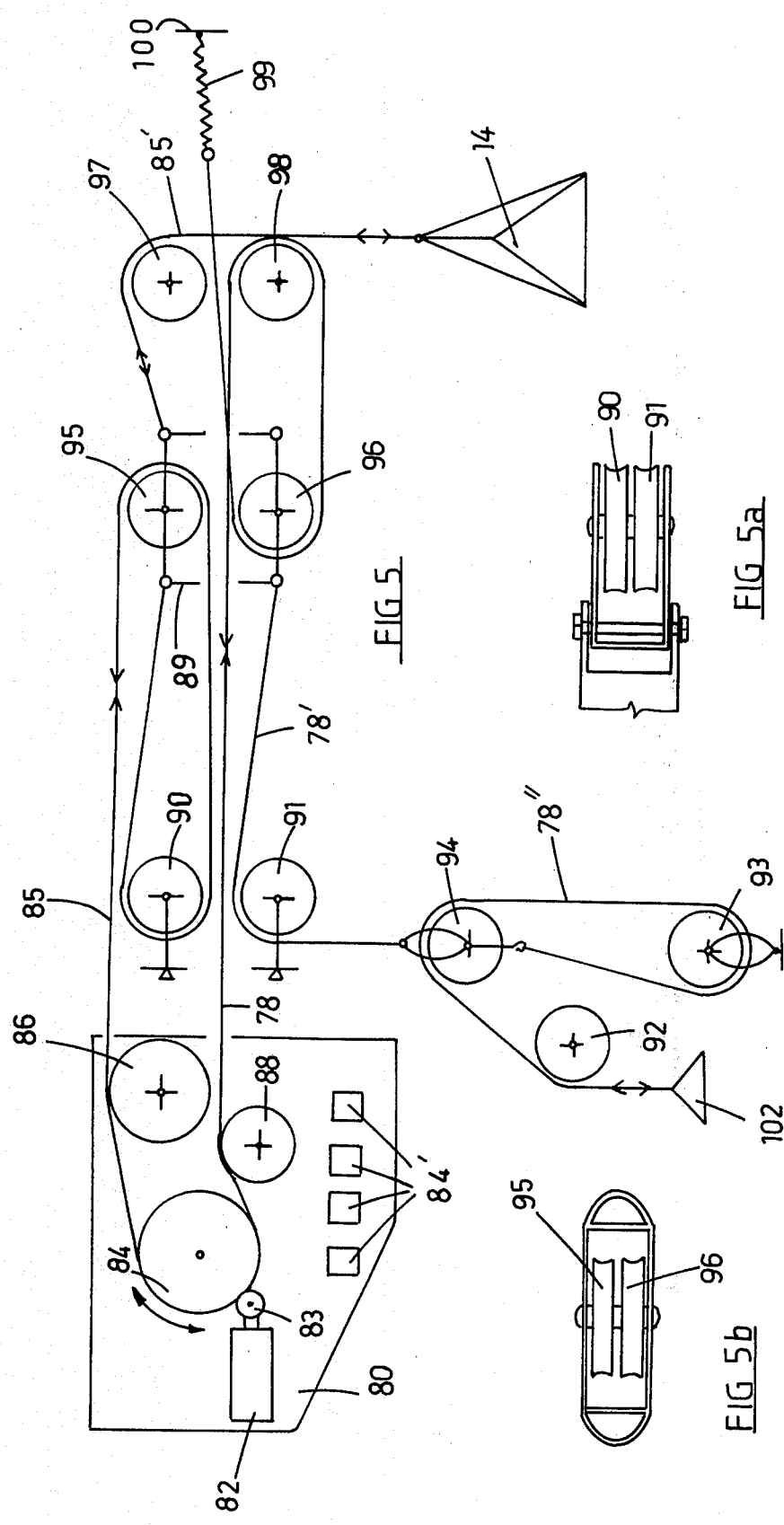
FIG. 5 is a schematic diagrammatic view of the pilot suspension means maneuvering mechanism.

In FIG. 5 there is illustrated schematically the pilot harness raising and lowering mechanism. The flat base 80 is mounted back of and to the left of the A frame maneuvering mechanism illustrated in FIG. 3 and on the floor below projector housing 12. The pulley and wires illustrated to the right of platform 80 are in practice mounted at right angles to the position illustrated in FIG. 5 but are represented in this manner for clarity.

Figure 2:
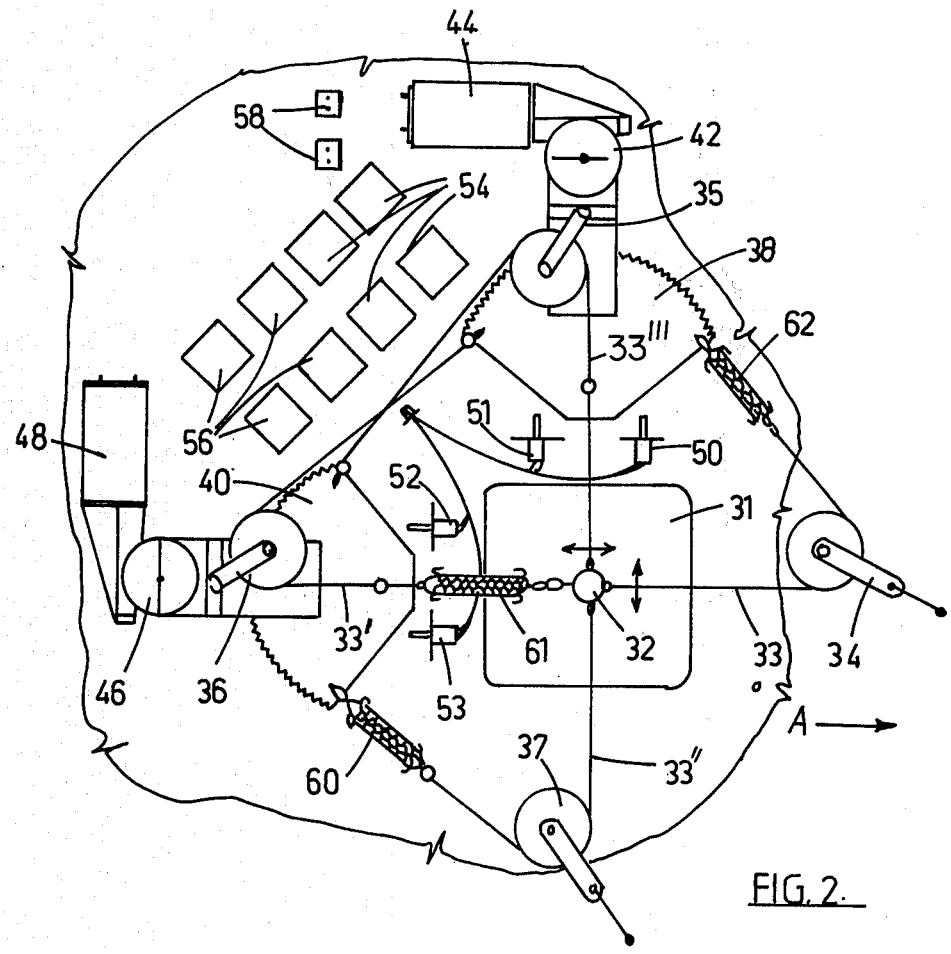
FIG. 2 is a top plan view of the control bar maneuvering mechanism.

Motor 82 is of the same type as motors 44 and 48 illustrated in FIG. 2. Driving gear 83 drives a drum 84 about a fixed axis. Wire 85 passes over guide pulley 86 around moveable pulley wheel 95 back over fixed pulley 90 to frame 89 from the other side of which leads a wire 85' over pulley 97 to harness 14. Starting in a counter clockwise direction from drum 84 wire 78 leads over fixed axis pulley 88. It then proceeds over fixed axis pulley 98 and over pulley 96 to spring 99 on anchoring point 100. Wire 78' leads from frame 89 over fixed pulley 91 to join pulley 94. Wire 78" leads from pulley 94 under anchored pulley 93 over pulleys 94 and 92 to counter-weight 102. Top plan detailed views of fixed pulleys 90 and 91 and moveable pulleys 95 and 96 are shown in FIGS. 5A and 5B, respectively.

Figure 6:
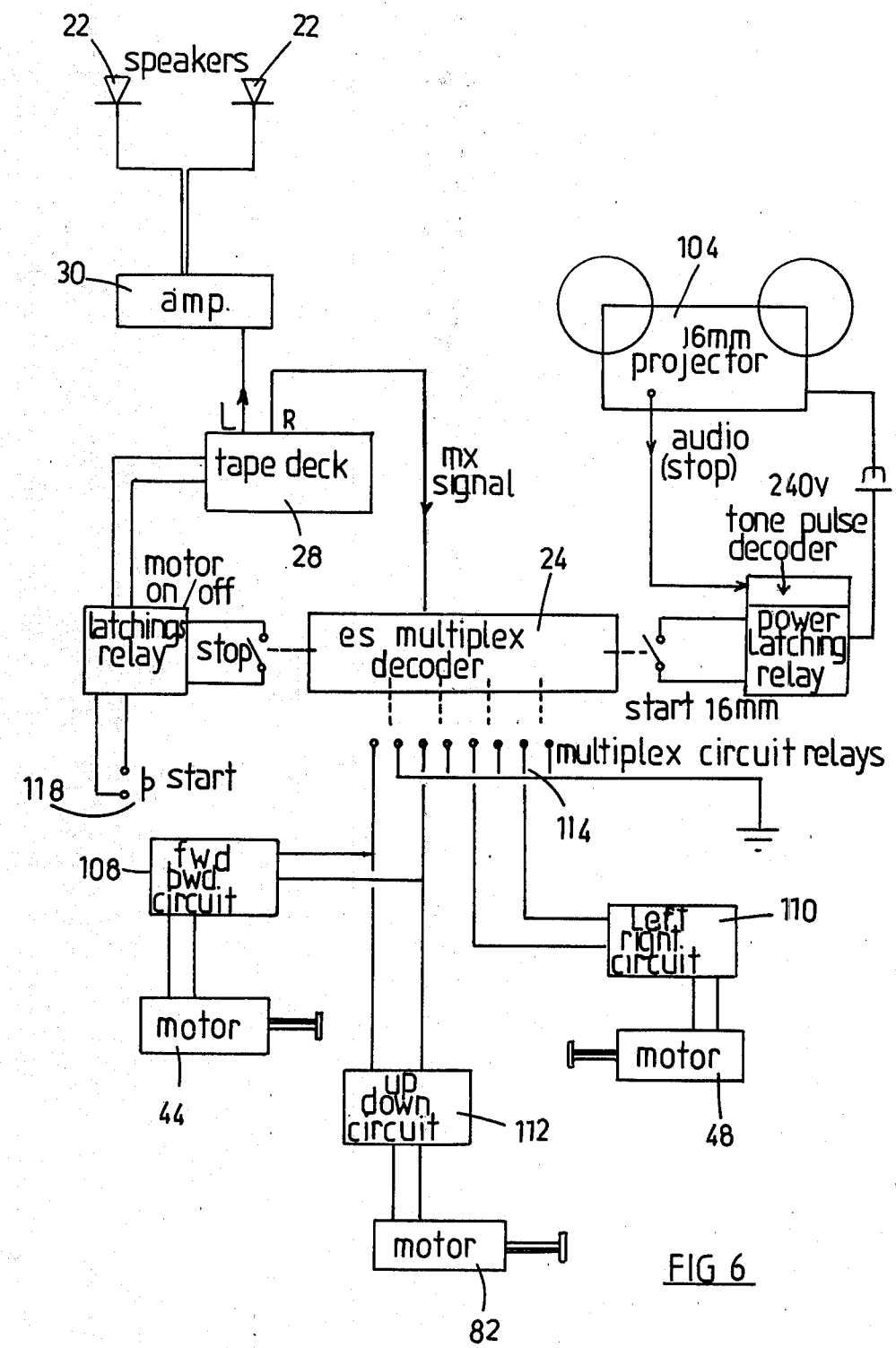
FIG. 6 is a schematic diagram of the control circuits according to the invention.

The general circuit diagram is illustrated in FIG. 6. Corresponding reference numerals to the earlier figures are included. The four switches on control handle 64 control respectively the start button 118, the backward/forward circuit 108, the left/right circuit 110 and the up/down circuit 112.

In FIG. 7 there is illustrated the circuit diagram for controlling the operation of motor 44. The control of motors 82 and 48 is by identical circuits and is not repeated herein. The multiplex circuit relay 114 allows the automatic operation of the circuit whereas manual relay 116 provides for manual operation. The limit switches 52 and 53 illustrated in FIG. 2 make up a part of this circuit. Similarly the control relays 56 are a part of this circuit.

The first step in the operation of an apparatus according to this invention is to program a flight simulating sequence. A film of a hang gliding flight made from a camera mounted with a view close to that of a pilot is placed on the projector 104. The multiplex decoder 24 is encoded by using manual operation of switch 116 and the corresponding switches controlling the operation of motors 44 plus 48 and 82 so that the programmer encodes onto the sound track on the film itself signals corresponding to up and down motions in the pilot's harness 14 and side to side or backward and forward movements in the A frame control bar 16. In the cases where the film includes a sound track the sound track is transferred to a tape which in operation in tape deck 28 is sychronized with the film being projected on screen 18. It will be appreciated that it is of assistance to have a projector with a stop frame capacity to assist in the operator start program of the copied track on the film and taped sound effects in simulation to operate the three motors in the simulator.

Once the film has been programmed a pupil is positioned in the appropriate harness 14 or 70 and the flight instructor pushes the start button 118. The flight sequence encoded onto the film raises and lowers the pilot and moves the A frame control bar backwards and forwards and from side to side to coincide with movements of the cameraman in the original film. It will be appreciated that two way tensioning springs 60, 61 and 62 allow for some operator input into the control bar to simulate some pilot control of the hang glider. In preferred embodiments the film is accompanied by a sound track stored on a separate tape. Simulated wind can also be provided by a variable speed fan system.

Those skilled in the art will know that if the front of the wing of a hang glider is allowed to lift too high the glider will be in a stall attitude. The A frame control bar of a common Rogallo hang glider is rigidily fixed to the wing and pushing this bar too far forward will cause this stall attitude to occur. To familarise the trainee pilot to this a stall warning horn 77 is provided as illustrated in FIG. 4. When the head 32 of the A frame control bar tilts too far forward it activates the horn switch 19 to warn of the stall.

What we claim is:

1. A hang glider flight simulator comprising:
   A. a pilot suspending means,
   B. a control means,
   C. means from which said pilot suspending means and control means are suspended,
   D. means associated with said means from which said pilot suspending means and control means are suspended for maneuvering said pilot suspending means and said control means to simulate movements occuring during hang gliding,
   E. visual display means positioned to be viewed by a pilot in said pilot suspending means, and
   F. means for synchronizing said means for maneuvering with said visual display means so that in use movements simulated by said means for maneuvering correspond to images displayed by said visual display means.

2. A simulator as claimed in claim 1 wherein said means for maneuvering comprises means for raising or lowering said pilot suspending means and means for moving from side to side and backwards and forwards said control means.

3. A simulator according to claim 2 wherein said visual display means comprises a movie projector and screen.

4. A simulator according to claim 3 wherein said synchronizing means comprises a decoder for reading and acting on signals encoded on a film in said projector.

5. A simulator according to claim 4 wherein said decoder has an encoding function as well.

6. A simulator according to claim 3 wherein there is provided a film on said movie projector having sound track encoding messages controlling the operation of said maneuvering means and a separate sound track synchronized with said encoded film.

7. A simulator according to claim 6 wherein said projector is provided with a wide angled lens and said screen is a parabolic screen.

8. A simulator according to claim 2 wherein said control means comprises a control bar and there are provided biasing means in said control bar maneuvering means to allow pilot input of motion into said maneuvering means.

9. A simulator according to claim 8 and further comprising a stall warning activated by forward motion of said control bar.

10. A simulator according to claim 1 wherein automatic or manual control means are provided for said synchronizing means.

11. A simulator according to claim 5 wherein said means for maneuvering have a manual control function to enable manual encoding of impulses on to said film.

12. A simulator according to claim 2 wherein said maneuvering means are driven by 12 volt reverse polarity DC motors.

13. A hang glider flight simulator in combination with a light-tight geodesic dome enclosing said simulator.

14. A simulator according to claim 2, wherein variable wind speed is controlled by backward and forward positions of control means movements.

* * * * *

UNITED STATES PATENT AND TRADEMARK OFFICE
CERTIFICATE OF CORRECTION

PATENT NO. : 4,355,982

DATED : October 26, 1982

INVENTOR(S) : CHRISTOPHER JAMES

It is certified that error appears in the above—identified patent and that said Letters Patent is hereby corrected as shown below:

In Figure 7 change reference numeral "116" at the top of the sheet to --114--.

Signed and Sealed this

Eighth Day of March 1983

[SEAL]

Attest:

GERALD J. MOSSINGHOFF

Attesting Officer — Commissioner of Patents and Trademarks